Jan. 3, 1961 E. J. NOWAK 2,967,053
CUT-OFF GUIDE AND MITRE JIG FOR STORM WINDOW AND SCREEN STOCK
Filed July 15, 1958
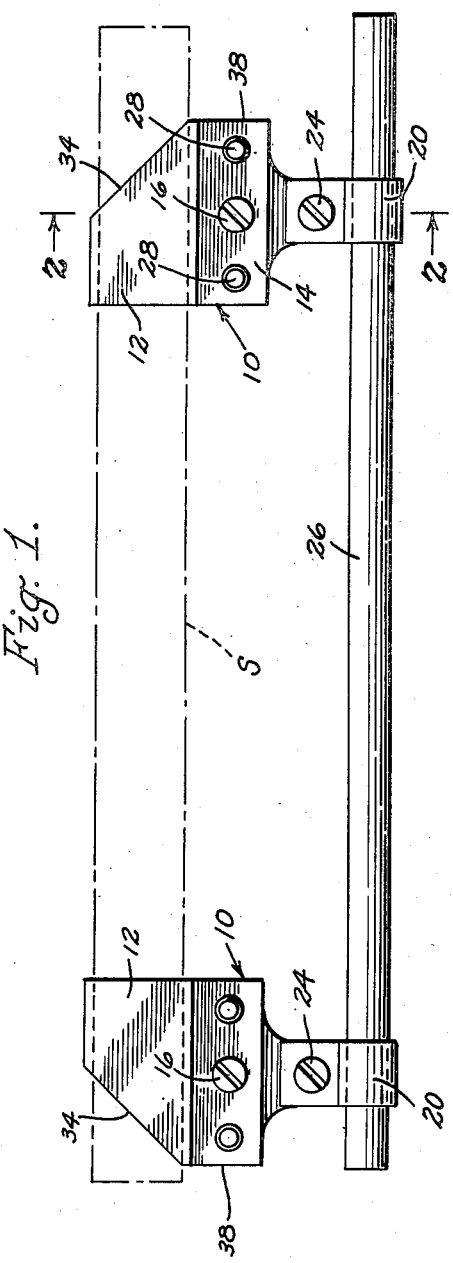
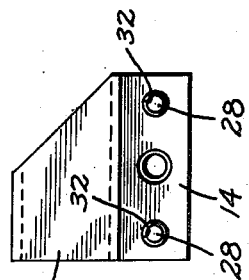
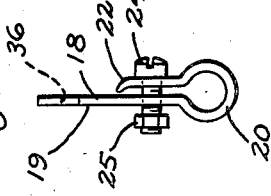
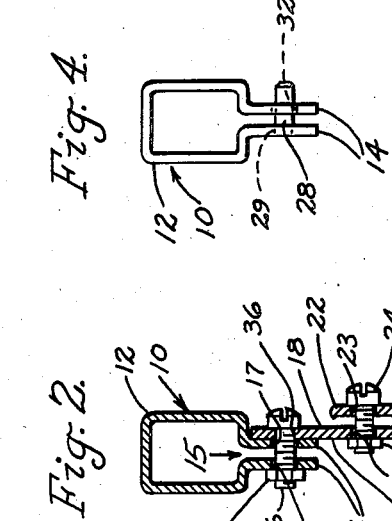
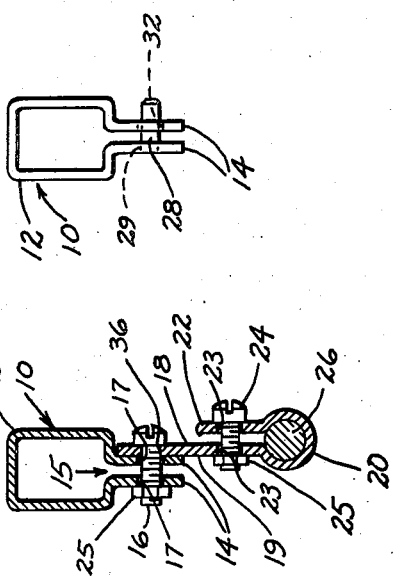
INVENTOR.
EUGENE J. NOWAK
BY
McMorrow, Berman & Davidson
ATTORNEYS

United States Patent Office 2,967,053
Patented Jan. 3, 1961

2,967,053

CUT-OFF GUIDE AND MITRE JIG FOR STORM WINDOW AND SCREEN STOCK

Eugene J. Nowak, 12315 Elmdale Ave., Detroit, Mich.

Filed July 15, 1958, Ser. No. 748,621

2 Claims. (Cl. 269—128)

This invention relates to devices for facilitating the cutting of lengths of material. More particularly, the invention has reference to a cut-off guide and mitre jig, especially designed to facilitate cutting lengths of frame stock of storm windows and screens.

Storm windows and screens of modern construction are generally formed of aluminum material or the like, and the invention has particular reference to the cutting of material of this nature. Accordingly, in carrying the invention there is provided a device which will be swiftly applicable to a length of storm window or screen stock, and which will then permit the cutting of said stock to a desired length, with mitred or beveled ends. After the stock is cut, of course, it is assembled with other pieces of similar stock, at right angles thereto with mitre joints being provided at the intersection of adjacent pieces of the bar stock. It will become apparent, thus, that the frame of a storm window or screen can then be readily assembled, with mitre joints at the several corners thereof, and with all the component parts of the frame properly cut to a selected length.

An object of the invention is to provide a jig as stated which, following the cutting of one length of bar stock, will be already set to permit the cutting of other lengths of stock to the same length as the first piece cut.

Another object is to provide a jig of the character stated which can be swiftly associated with the length of stock that is to be cut, and can be removed from said length with equal swiftness, thus to permit rapid interchange of pieces of bar stock.

Another object is to provide a jig of the character stated which will be particularly shaped for cutting lengths of stock of the particular type described.

Other objects will appear from the following description, the claims appended thereto, and from the annexed drawing in which like reference characters designate like parts throughout the several views and wherein:

Figure 1 is an elevational view of a jig of the character stated, as it appears when in use, the length of stock that is to be cut being shown in dotted lines;

Figure 2 is a transverse sectional view on line 2—2 of Figure 1;

Figure 3 is an elevational view of the stock-receiving component of the device;

Figure 4 is an end elevational view of said component; and

Figure 5 is an elevational view of the support-rod-receiving component of the jig.

Referring to the drawing in detail, designated generally at 10 are spaced holders for a length of bar stock S that is to be cut. The holders 10 are of identical formation, except for having oppositely inclined outer end edges, so the description of one will suffice for both.

The holder 10 includes a split sleeve 12 which, as shown in Figure 2, is of approximately rectangular cross section in the illustrated example, since stock S is of a corresponding cross section. Aluminum storm window and screen stock is generally of a rectangular cross sectional shape, and it will be understood in this connection that the sleeves 12 would vary in cross section, according to the cross sectional shape of the particular type of stock S that is to be engaged in the sleeve.

The sleeve 12 is formed from a length of metal material bent to shape, and at the bottom of the sleeve, viewing the same as in the several figures of the drawing, legs 14 are formed, comprising the end portions of the length of material from which the sleeve is bent. Legs 14 are spaced apart by the split 15 of the sleeve, and are adapted to receive a bolt 16, the legs having smooth-walled openings 17 for this purpose.

A support member 18 extends from one of the legs 14, and is formed from a single piece of material bent to shape. The support member 18 includes an elongated leg 19 merging into a split sleeve 20 which in turn merges into a shorter leg 22 spaced from the leg 19. The legs 19, 22 are formed with smooth-walled openings 23 adapted to receive a connecting bolt 24. Nuts 25 are applied to the bolts 16, 24 respectively.

Designated at 26 is an elongated, rigidly constituted support rod, which is adapted to extend parallel to the length of stock S. The support rod extends through and is adapted to be clampably engaged in the sleeves 20, responsive to movement of the legs 18, 22 toward each other by threading of the nut on the screw toward the head of the screw 24.

A pair of aligning pins 28 is carried by each of the holders 10, at opposite sides of and in alignment with the screw 16. Referring to Figure 4, each aligning pin is pressed into an opening 29 formed in one of the legs 14, and is welded on the outside, that is, the outer surface of the leg. The shank of each pin 28 extends loosely through an opening 32 formed in the other leg 14.

By reason of the arrangement illustrated and described, in use of the device one would first slide the holders 10 onto the opposite end portions of the length of stock S that is to be cut. As will be noted, each sleeve 12 of a holder 10 is beveled or mitred at one end as at 34. The mitred edges are oppositely arranged, that is, are faced outwardly from one another as shown in Figure 1. The angularity of the beveled or mitred end edges 34 of each sleeve 12 is forty-five degrees to the length of the stock S.

As a second step, the member 18, the long legs 19 of which have three spaced openings 36 adapted to receive the shanks of the aligning pins 28 and of bolt 16 of the associated holder 10, is positioned on the holder. The openings 36 of each member 18 receive the shanks of pins 28, with leg 19 in face-to-face contact with the leg 14 of the holder spaced from the holder leg 14 to which pins 28 are welded. Screw 16 and nut 25 thereof are now employed to secure the connecting member to the holder.

The rod 26 is now inserted through the sleeves 20 and screws 24 are employed to tighten the sleeve 20 about the rod. However, before this is done, one makes the necessary measurements, measuring from outer end edge 38 of one holder 10 to the corresponding outer end edge of the other holder. In other words, the holders are adjusted to a selected, spaced relationship to locate the beveled edges 34 at the predetermined points along the length of the stock S. Only after this measurement is made and the holders have been adjusted are the screws 24 employed to fixedly clamp the rod 26 in the sleeves 20.

Tightening of the screws 24 will now insure that the holders 10 will remain in the proper, prescribed, spaced relationship.

One now uses a hacksaw or similar tool, not shown, to cut the stock S along the edges 34. The cut edges can be filed if desired.

One now removes the screws 16, or rather loosens the same sufficiently to eliminate the clamping engagement between sleeves 12 and the stock S. This permits the stock S to slide out of the sleeves 12, after which another length of stock is inserted. Once again, the sleeves 12 are tightened about the length of stock, and the new length is cut. In other words, a substantial number of different lengths may be cut to identical dimensions with mitred ends, to permit their being connected in a manner to form corner mitre joints of a storm screen or window frame.

Obviously, the device has particular adaptability for cutting lengths of stock of the character described. However, it is believed that with some modifications in the cross sectional shape of the sleeves 12, the invention could be adapted for use in the cutting of mitred edges on tubular stock of circular cross section, solid bar stock, etc.

The holders 10 should be of steel that can be file-hardened, so that no damage at the angle 34 can be made by a hacksaw and file.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A cut-off guide and miter jig comprising an elongated rod, a pair of similar but reversed heads mounted at selected spaced locations along said rod, said heads comprising split sleeves shaped to accept stock of a selected cross-section, said sleeves having sides having splits therein, parallel spaced ears on said sides at opposite sides of the splits, first clamping bolts traversing said ears for clamping the sleeves on stocks, split rod clamps having substantially circular intermediate portions conformably embracing said rod, said clamps having long legs, and short legs in spaced parallel relationship, second clamping bolts traversing said long and short legs for clamping the clamps on the rod, said long legs having end portions bearing against ears of the sleeves and clampably traversed by the first clamping bolts, and means for precluding rotation of the sides of the sleeves relative to each other, said sleeves having angled longitudinally outward stock cutting miter edges.

2. A cut-off guide and miter jig comprising an elongated rod, a pair of similar but reversed heads mounted at selected spaced locations along said rod, said heads comprising split sleeves shaped to accept stock of a selected cross-section, said sleeves having sides having splits therein, parallel spaced ears on said sides at opposite sides of the splits, first clamping bolts traversing said ears for clamping the sleeves on stocks, split rod clamps having substantially circular intermediate portions conformably embracing said rod, said clamps having long legs, and short legs in spaced parallel relationship, second clamping bolts traversing said long and short legs for clamping the clamps on the rod, said long legs having end portions bearing against ears of the sleeves and clampably traversed by the first clamping bolts, and means for precluding rotation of the sides of the sleeves relative to each other, said sleeves having angled longitudinally outward stock cutting miter edges, said means comprising pins secured to ears of the sleeves at opposite sides of said first clamping bolt, other ears of the sleeves having openings through which said pins extend.

References Cited in the file of this patent

UNITED STATES PATENTS

| 188,657 | Mosher et al. | Mar. 20, 1877 |
| 229,670 | Carrick | July 6, 1880 |
| 877,105 | Moore | Jan. 21, 1908 |
| 1,521,908 | Schuster | Jan. 6, 1925 |

FOREIGN PATENTS

| 136,532 | Germany | Dec. 1, 1902 |